(12) United States Patent
Laitinen et al.

(10) Patent No.: US 8,487,751 B2
(45) Date of Patent: Jul. 16, 2013

(54) KEYPAD

(75) Inventors: Pauli Laitinen, Helsinki (FI); Mika Kauhanen, Espoo (FI)

(73) Assignee: Nokia Corporation, Espoo (FI)

( * ) Notice: Subject to any disclaimer, the term of this patent is extended or adjusted under 35 U.S.C. 154(b) by 901 days.

(21) Appl. No.: 12/595,590

(22) PCT Filed: Apr. 12, 2007

(86) PCT No.: PCT/EP2007/003247
§ 371 (c)(1),
(2), (4) Date: Nov. 17, 2009

(87) PCT Pub. No.: WO2008/125130
PCT Pub. Date: Oct. 23, 2008

(65) Prior Publication Data
US 2010/0052880 A1    Mar. 4, 2010

(51) Int. Cl.
*H04B 3/36* (2006.01)
(52) U.S. Cl.
USPC .................. 340/407.2; 340/407.1; 340/815.4; 340/815.42
(58) Field of Classification Search
USPC ................... 340/407.1, 407.2, 815.4, 815.42, 340/815.45, 815.53, 815.54
See application file for complete search history.

(56) References Cited

U.S. PATENT DOCUMENTS

| | | |
|---|---|---|
| 6,492,979 B1 | 12/2002 | Kent |
| 7,206,107 B2 | 4/2007 | Levola |
| 2002/0042291 A1* | 4/2002 | Lahteenmaki et al. ....... 455/566 |
| 2003/0179190 A1 | 9/2003 | Franzen |
| 2004/0130538 A1 | 7/2004 | Lin |
| 2005/0054390 A1 | 3/2005 | Tuovinen |
| 2005/0253816 A1 | 11/2005 | Himberg |
| 2006/0052143 A9 | 3/2006 | Tuovinen |
| 2006/0066579 A1* | 3/2006 | Bladt ............................ 345/173 |
| 2006/0126179 A1 | 6/2006 | Levola |
| 2006/0254894 A1 | 11/2006 | Jung et al. |
| 2007/0103449 A1 | 5/2007 | Laitinen et al. |
| 2008/0204418 A1* | 8/2008 | Cybart et al. ................. 345/173 |
| 2009/0244706 A1 | 10/2009 | Levola et al. |
| 2010/0039832 A1 | 2/2010 | Ahlgren et al. |

FOREIGN PATENT DOCUMENTS

| | | |
|---|---|---|
| CN | 1217120 A | 5/1999 |
| CN | 1605560 A | 4/2005 |
| CN | 1862732 A | 11/2006 |
| EP | 1449267 A1 | 8/2004 |
| EP | 1522521 A1 | 4/2005 |
| WO | 97/33417 A1 | 9/1997 |
| WO | 2007/042852 A1 | 4/2007 |

OTHER PUBLICATIONS

Office Action received in corresponding Chinese Application No. 200780052553.X, Dated Nov. 9, 2011, 8 pages.
International Search Report and Written Opinion Received In The Corresponding PCT Application No. PCT/ EP2007/003247 dated Feb. 27, 2008, p. 1-17.

(Continued)

*Primary Examiner* — Daryl Pope
(74) *Attorney, Agent, or Firm* — Harrington & Smith (57) ABSTRACT

A thin keypad including a top surface layer, a light guide layer, a capacitive sensing layer and a piezo layer provides for touch input, pressure input and haptic feedback.

20 Claims, 4 Drawing Sheets

OTHER PUBLICATIONS

Office Action received for corresponding European Patent Application No. 07724188.3, dated Jan. 24, 2011, 5 pages.

Office Action received for corresponding Chinese Patent Application No. 200780052553.X, dated Dec. 9, 2010, 11 pages of Office Action & 14 pages of Office Action translation.

Office Action received for corresponding Chinese Patent Application No. 200780052553.X, dated May 17, 2012, 3 pages of Office Action & 2 pages of Office Action translation.

* cited by examiner

KEYPAD

RELATED APPLICATION

This application was originally filed as PCT Application No. PCT/EP2007/003247 filed on Apr. 12, 2007, which is incorporated herein by reference in its entirety.

FIELD OF THE INVENTION

The present invention relates to a thin keypad, in particularly to a thin keypad that includes a capacitive sensor and provides haptic feedback.

BACKGROUND OF THE INVENTION

Mobile devices become smaller and at the same time more complex.

One challenge in mobile phone user interface design is that the spatial requirements for the keypad to shrink along with the other mechanical parts. This is especially pronounced in the thickness of the parts, as the devices are driven to more slim design.

Another challenge in mobile phone user interface design is to provide a user interface that is intuitive, easy to learn, behaves in a consistent, predictable manner and makes the best use of limited operation face surface area. A user interface needs to provide a sufficient number of controls to manage the inherent complexity of the mobile phone whilst ensuring that there are not too many controls are options available to the user at any one time, thereby causing confusion.

Thus, aspects of the invention aim to provide a user interface that is better adapted to meet these contradicting demands.

The above also applies to various types of mobile devices, such as mobile phones, PDA's, music or multimedia players, cameras, navigation devices, etc.

DISCLOSURE OF THE INVENTION

On this background, it is an object of the present invention to provide a mobile device that fulfills at least partly the above indicated demands.

This object is achieved by providing a mobile device comprising a keypad and a processor, the keypad comprising a top surface layer, a light guide layer below the top surface layer one or more optical sources controlled by the processor and coupled to the light guide, a capacitive sensor coupled to the processor, and a piezo element coupled to the processor, the capacitive sensor being configured to sense touch contact and location on the top surface layer, and the piezo element being configured to sense pressure applied to the top surface.

The combination of a capacitive sensor and a light guide allows for a very thin construction of the keypad, whilst the piezo element allows for improved determination of keystrokes by pressure sensing.

Preferably, the piezo element is configured for vibrating the keyboard.

The processor can be configured to detect a keystroke via a signal from the piezo element.

The processor can be configured to send a vibration signal by activation of the piezo element upon detection of a keystroke.

Thus, haptic feedback can be provided to the user to indicate that a keystroke has been accepted, thereby improving user confidence in a way that does not require a large thickness, like in mechanical "click" systems, and that does not require the use of irritating beeps for confirming a keystroke.

The top surface layer can be monolithic. Thus, the keypad can also be used as a touchpad.

The top surface layer may comprise a plurality of discrete keys. The top surface layer can be a keymat.

A part of the capacitive sensor can be formed by a semi-conductive layer and the non-conductive top surface layer.

It is another object of the present invention to provide a capacitive keypad construction that at least partly fulfills the demands indicated above. This object is achieved by providing a capacitive keypad construction comprising an electrically non-conductive top surface layer that is at least locally transparent to light, a capacitive sensor layer under the top surface layer, a piezo layer, and an electrically non-conducting light guide layer disposed between the capacitive sensor layer and the piezo layer.

The capacitive sensor layer is sensitive to high voltage. The piezo layer uses high-voltage. By placing the electrically non-conducting light guide layer between the capacitive sensor layer and the piezo layer, the light guide layer assumes a second function, namely electrically insulating the capacitive layer from the piezo layer. By using one layer for two functions, one physical layer can be omitted form the keypad and the thickness of the resulting keypad is reduced.

The piezo layer can include a piezo sensor. The piezo layer can include a piezo actuator.

The light guide can be provided with embossed gratings or with micro-prisms for coupling out light through the top surface layer.

It is another object of the present invention to provide a thin keypad that at least partly fulfills the above indicated demands. This object is achieved by providing a thin keypad comprising an at least locally transparent top surface layer, a light guide layer below the top surface layer, one or more optical sources coupled to the light guide, the light guide layer being configured to emit light received from the optical source through the top surface layer in at least two patterns with different graphical layouts, and the light guide and the one or more optical sources being configured to selectively emit the light in one of the at least two patterns.

The patterns can represent groups of different keypad icons.

In the light guide can be provided with embossed gratings or with micro-prisms for out coupling light through the top surface layer.

The light guide can comprise a diffractive light guide sheet with insulation films on both sides.

The diffractive light guide can comprise multiple layers for providing more than two separate patterns.

The top layer can comprise a plurality of discrete keys. The top layer can be a keymat.

The keypad may comprise a layer with a plurality of collapsible domes that is disposed below the light guide layer.

The keypad may further comprise a layer with downwardly projecting dome pins disposed between the light guide layer and the layer with collapsible domes.

The top surface layer can be monolithic.

The keypad may include a capacitive sensor, preferably a part of the capacitive sensor is formed a semi-conductive layer and the non-conductive top surface layer.

The insulation layers can be formed by liquid layers.

The insulation layers can be formed by layers with a refraction index that substantially differs from the refraction index of the light guide.

The insulation layers can be formed by thin air gaps.

It is another object of the invention to provide a method for user input that does not have or at least reduces the drawbacks explained above. This object is achieved by providing a method for user input and feedback with a keypad or touchpad that includes a capacitive touch sensor, a pressure sensor and an actuator, the method comprising determining the position on the keypad or touch pad at which an object touches by means of a signal from the capacitive touch sensor, determining the pressure at which the keypad or touchpad is touched by means of the pressure sensor, accepting user input in accordance with the detected position and pressure, and providing feedback to the user by activating the actuator in accordance with the detected user input.

A moving low to medium pressure contact with the keypad or touchpad can be interpreted as a navigational input.

A substantially nonmoving medium to high pressure contact with the keypad or touchpad can be interpreted as a keystroke.

The actuator can be activated upon detection of a keystroke for providing the user with haptic feedback concerning the acceptance of the keystroke.

The actuator can be activated during detection of navigational input.

The type of activation of the actuator can be dependent on the type of input and/or on the type of application in which the input is used and or on the other operating conditions of the device in which the keypad is used.

Further objects, features, advantages and properties of the keypad and mobile device according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF PREFERRED EMBODIMENTS

Figure 1:
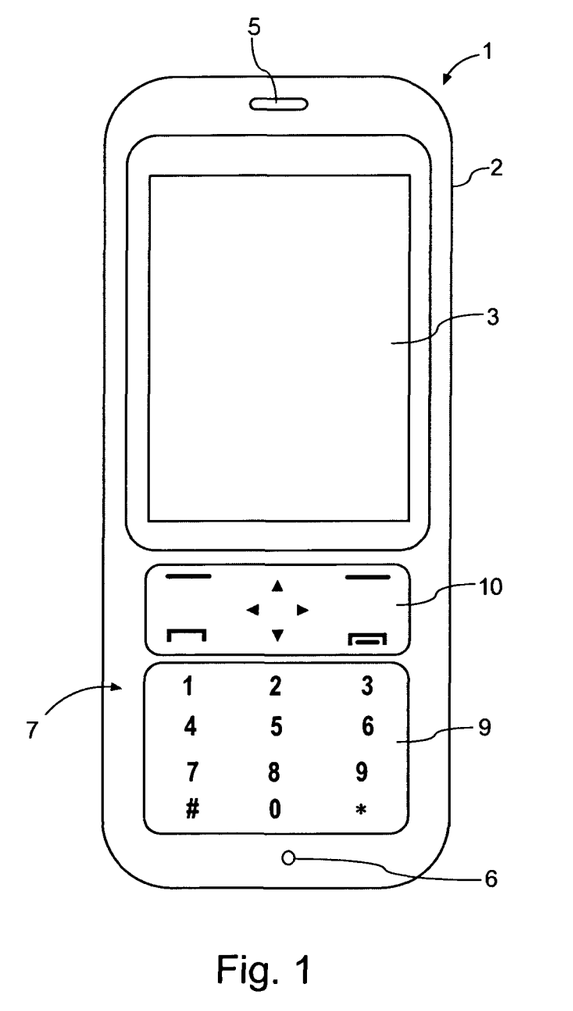
FIG. 1 is a front view of a mobile device according to an embodiment of the invention.

In the following detailed description, the keypad and mobile device according to the invention will be described by the preferred embodiments FIG. 1 illustrates a mobile device according to an embodiment of the invention in the form of a mobile phone 1. The mobile phone 1 includes a housing 2, a display 3, a speaker 5, a microphone 6 (only the opening in the housing of the speaker and the microphone can be seen in FIG. 1) and a keypad 7. The keypad includes an adaptive part 9, here shown with numerical keys and a part 10 with navigation keys and soft keys and call handling keys.

The display 3, the speaker 5, the microphone 6, and the keypad 7 are connected in a well-known manner to a processor (not shown) in the mobile phone 1.

Figure 2:
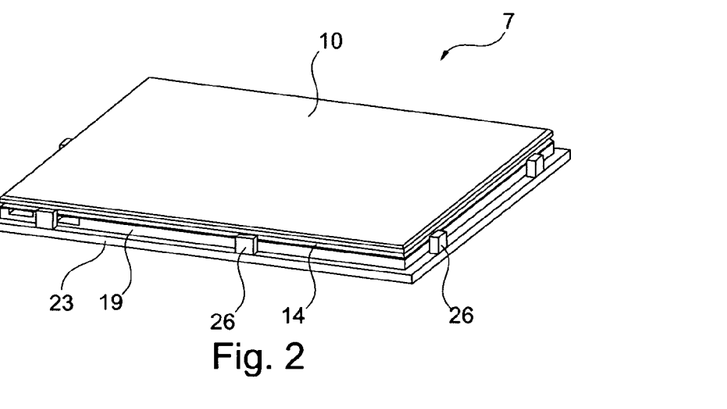
FIG. 2 is an elevated view of a keypad according to an embodiment of the invention.
Figure 3:
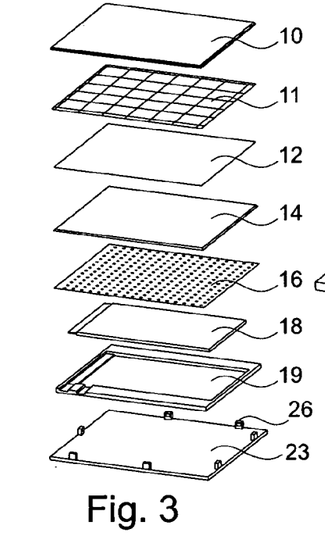
FIG. 3 is an exploded view of the keypad shown in FIG. 2.
Figure 4:
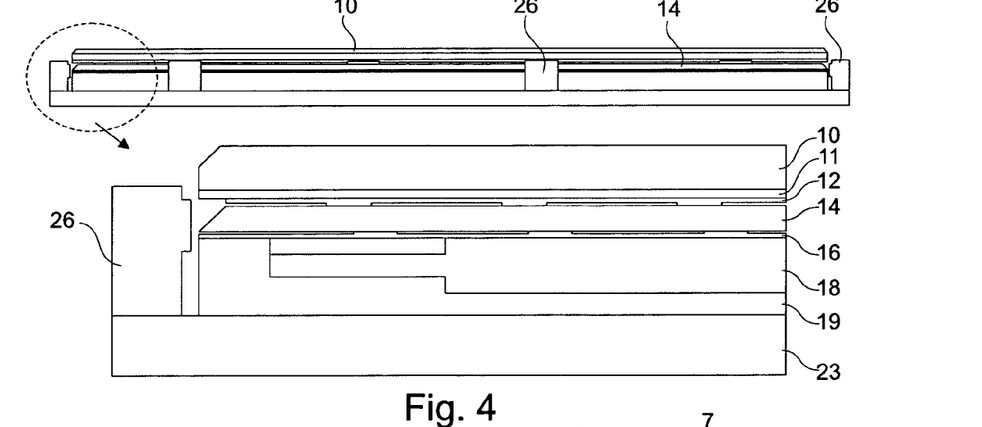
FIG. 4 is an enlarged side view of the keypad shown in FIG. 2.

A first embodiment of the keypad or touchpad 7 according to the invention is illustrated in FIG. 2 by an elevated view and in FIG. 4 by an exploded view. The pad includes a top mat 10 that forms the top surface layer. A capacitive sensor sheet 11 is placed below the top mat 10. An upper light guide insulator layer 12 is placed below the capacitive sensor layer 11. A light guide layer 14 is placed under the upper light guide insulator layer 12. The light guide layer 14 can be formed as a stack of light guides. A lower light guide insulator layer 16 is disposed below the light guide layer 14.

A bending actuator layer 18 is placed below the lower light guide insulator layer 16.

The bending actuator layer 18 is formed by a piezo element that includes a piezo actuator and a piezo sensor. The piezo element can be one piezo strip or ring. The piezo sensor detects the force of touch based on strain subjected to it. The bending actuator layer 18 is supported by an actuating holder layer 19.

The keypad or touchpad 7 is placed on a printed wired board 23 that is provided with side shooting LEDs 26. The printed wired board can be a component that is integral with the device in which the keypad is to be used, such as for example a printed wire board of the mobile phone 1.

The bending actuator layer 18 and the actuator holder 19 provide tactile feedback and improve keystroke determination accuracy. The bending actuator layer is coupled to do the processor (not shown) of the device in which the keypad or touchpad is to be used. The piezo sensor part of the bending actuator layer 18 registers pressure applied by a user. A pressure above a predetermined threshold is considered as a keystroke. The position on the keymat or touchpad at which the keystroke takes place is determined with the signal from the touch sensor that is also coupled to the processor of the device in which the keypad or touchpad is to be used.

Upon detection of a keystroke, the processor shortly activates the actuator part of the bending actuator layer 15 to provide tactile feedback to the user. The actuation may be in a repetitive pattern that is experienced as a vibration by the user. Thus, the user receives a tactile feedback when a keystroke is registered that is similar to the click of a keypad with collapsible domes.

The combination of touch sensing (capacitive) and pressure sensing (piezo) and using force as input is used to provide a designable feedback. The capacitive sensor detects the location and the piezo a sensor provides for the "click" and provides vibrating feedback. This makes the keypad significantly more adaptive and customizable touch interface.

A moving low to medium pressure contact with the keypad or touchpad is interpreted as a navigational input. A substantially nonmoving medium to high pressure contact with the keypad or touchpad is interpreted as a keystroke. Various suitable thresholds for low, medium and high pressure can be preprogrammed into the processor of the device.

The actuator is activated upon detection of a keystroke for providing the user with haptic feedback concerning the acceptance of the keystroke. The actuator can also be activated during detection of navigational input.

The haptic feedback can be in the form of a vibration signal or in the form of single "click". The intensity of the vibration signal and of the click can be varied in accordance with circumstances, and for example be determined by active application in which the user input is used, not by the state of the mobile device, such as in the profile of the device being set to indoor or two outdoor use, and all other operating conditions of the mobile device.

In this combined touch and pressure interface, proximity can be used as an activation function, for example to light up otherwise hidden user interface elements. The location sensor can also be used for handwriting recognition, and for navigation. The analog impulse for sensing can be used for zooming in maps or in images, and for acceleration in scrolling activities.

The graphics changing keypad/touchpad can be used for changing the input mode of the interface and can be hidden when the keypad is used as a touchpad, for example when drawing or navigating. The piezo feedback can be designed according to user preferences, usage context (indoor or outdoor) application (drawing gives different vibration pattern and quality than key presses or keystrokes).

Figure 5:
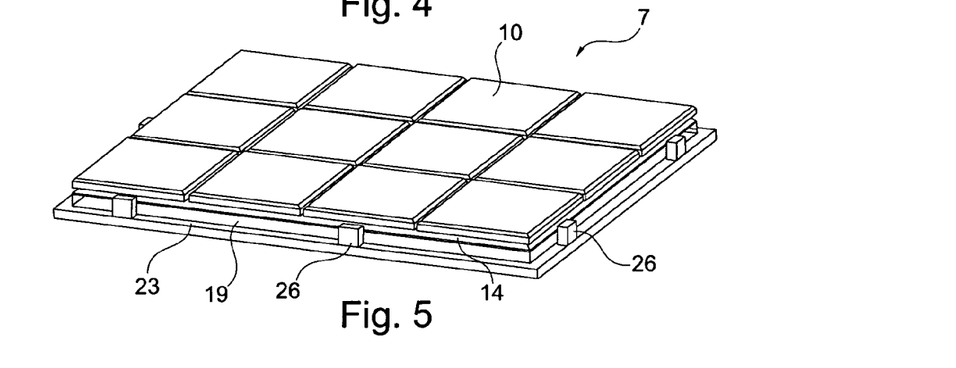
FIG. 5 is an elevated view on a variation of the keypad shown in FIGS. 2 to 4, FIG. 6a to 6d illustrate various graphic layouts of the keypad shown in FIGS. 2 to 5, FIGS. 7 to 9 illustrate examples of light leakage insulation layers for use in the keypad according to the invention by sectional side views and exploded views.

The keypad layout formed by the out coupled light is the second embodiment adapted as illustrated for the first embodiment via activation of the side shooting LEDs 26 in different directions. For more than two different patterns the light guide layer 16 is stacked.

As in the first embodiment, the keymat or touchpad 10 serves as the outer surface of the system and additionally suppresses the disturbance caused by ambient light. The effect of ambient light is minimized by color filters that enhance the visibility of the icons by absorbing the ambient light and by diffusive layers that direct the outgoing light to an optimal angle. Thus, the light is not emitted arbitrarily, but rather in the viewing angle of the phone operator. Additionally, the diffusive layer absorbs ambient light. In addition, the system incorporates an ambient light sensor (not shown) that controls the keypad light emission intensity according to the prevailing ambient lighting.

The top surface layer can be a transparent plastic or glass window. An indium tin oxide layer can be applied on the bottom of the top surface layer. The top surface layer 10 forms in combination with the capacitive layer 11 their below a touch sensor that determines the position of touch of the top surface layer by capacitive measurement. The capacitive layer is sensitive to high voltage that is used for the piezo element. The light guide layer 14 electrically insulates the capacitive layer 11 from the piezo element. Thus, the light guide layer assumes two functions and therefore the keypad according to this embodiment can have a thin construction.

The light emitted from the LEDs 26 is coupled to the light guide 14. The edge of the light guide is chamfered in order to provide an optimal input angle for the light entering the light guide 14. The top surface layer 10 is at least locally transparent and includes a diffusive layer. The top surface layer 10 is also incorporates one or more layers that reduce the disturbing effects of ambient light.

The light guide 14 is provided with embossed gratings or microprisms (not shown) for coupling out the light from the light guide. The out coupled light is directed upwards by the embossed gratings or microprisms and travels trough the keymat 10 (or touchpad) and encounters the diffusive layer in the top surface layer 10. The diffusive layer redirects the emitted light in an optimal angle to the phone operator's field of view.

The embossed gratings or microprisms are arranged such that the light exits the light guide in a predetermined graphical layout, for example a graphical layout corresponding to key prints including icons, letters, numbers or any other symbols that are used to identify keys. One LED 26 is provided for each column and one LED 26 is provided for each row. The embossed gratings or microprisms are arranged such that at least two different graphical layouts can be seen through the top surface layer, depending on the direction of the activated LEDs 26.

In the present embodiment, only one graphical layout is visible at the time, however it is also possible to allow several graphical layouts to be visible simultaneously.

Figure 6A:
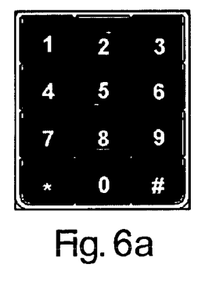
Figure 6B:
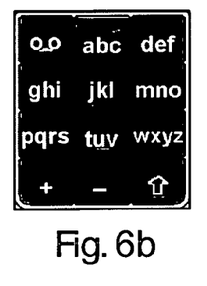
Figure 6C:
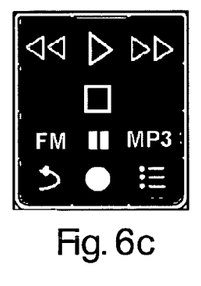
Figure 6D:
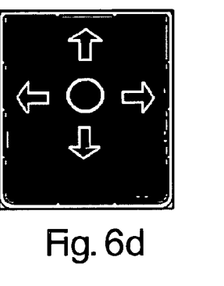

An example of such different graphical layouts is illustrated in FIGS. 6a to 6d. In FIG. 6a the LEDs 26 are activated such as to show a numerical keypad. In FIG. 6b the LEDs 26 are activated such as to show a keypad with letters, in FIG. 6c the LEDs 26 are activated such as to show a music player keypad, and in FIG. 6d the LEDs 26 are activated such as to show navigation icons.

The light guide 14 layer includes a diffractive plastic sheet having high-quality optical properties, such as for example PMMA foil. The sheet has gratings embossed on its surface for coupling out light form the light guide. The diffractive light guide 14 layer may include multiple layers in order to provide for more than two separate keypad layouts. Each layer is dedicated for different application keys. The working principle is based on the interdependence of grating density and light wavelength (color) able to pass through the grating. The grating pattern can be replaced with microprisms that can be produced with the same manufacturing method as the gratings. Microprisms allow usage of LEDS emitting white light.

Insulation film is a placed on both sides of the light guide 14. The upper insulating film or layer 12 and the lower insulating film or layer 16 keep dust and moisture from the sensitive diffractive light guide. The insulation films can be made of material having low index of refraction, like Teflon®AF polymers.

The keymat or touchpad 10 serves as the outer surface of the system and additionally suppresses the disturbance caused by ambient light. The effect of ambient light is minimized by color filters that enhance the visibility of the icons by absorbing the ambient light and by diffusive layers that direct the outgoing light to an optimal angle. Thus, the light is not emitted arbitrarily, but rather in the viewing angle of the phone operator. Additionally, the diffusive layer absorbs ambient light.

In addition, the system incorporates in an embodiment an ambient light sensor (not shown) that controls the keypad light emission intensity according to the prevailing ambient lighting.

The keypad layout formed by the out coupled light is in the alternative to the first embodiment adapted as illustrated for the first embodiment via activation of the various side shooting LEDs 26.

Light leakage can be minimized in several ways. The examples below apply to each of the embodiments above.

Figure 7:
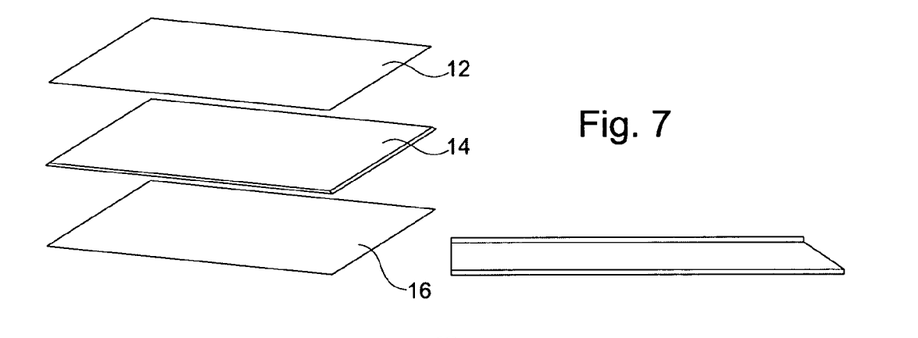

According to one example shown in FIG. 7, light leakage is minimized by a film 12,16 that is in contact with the light guide layer 16. Both sides of the light guide layer 16 are provided with such a film 12,16 that has a index of refraction that is substantially different from the index of refraction of the light guide and thereby light leakage from the light guide is minimized.

Figure 8:
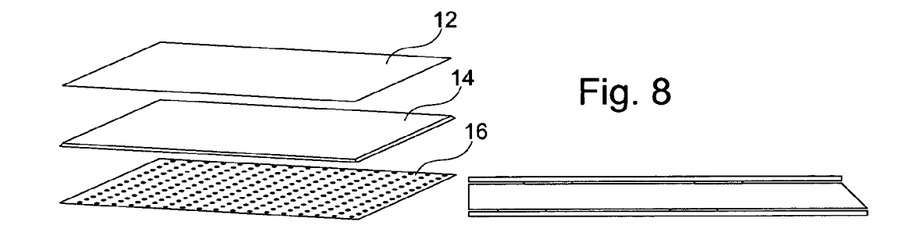

According to another example, shown in FIG. 8, light leakage is minimized with the film having a surface pattern that provides a small gap between the light guide layer 14 and the insulating layers 12,16 on top and the low thereof. The air in the gap between the light guide and the insulating layers has an index of refraction that is substantially different from the index of refraction of the light guide and thereby light leakage from the light guide is minimized.

Figure 9:
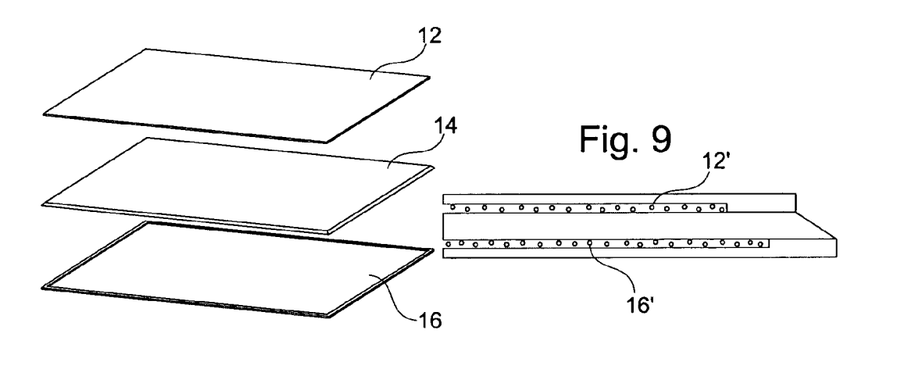

According to yet another example, shown in FIG. 9, light leakage is minimized by liquid layers 12' and 16' on top and under the light guide layer 14. The liquid can be a gel that is trapped in a narrow space above and under the light guide layer 14. The index of refraction of the gel is substantially different from the index of refraction of the light guide and thereby light leakage from the light guide is minimized.

Figure 10:
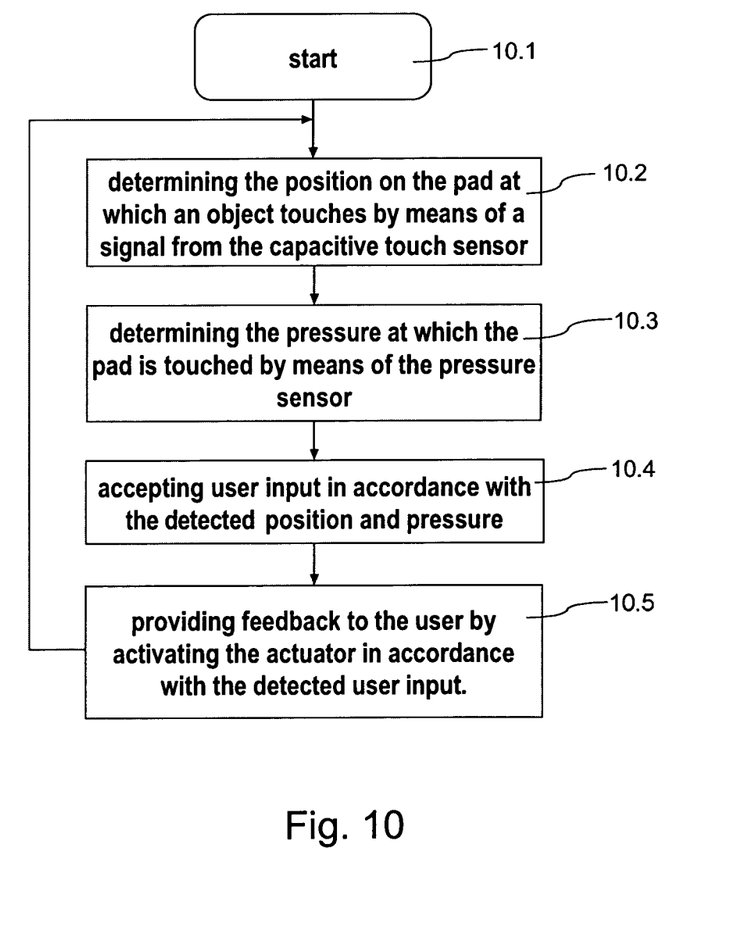
FIG. 10 is a flowchart illustrating a method according to an embodiment of the invention.

FIG. 10 illustrates a method of accepting input with a keypad or touchpad according to an embodiment of the invention. The method starts at step 10.1. The position at which an object touches the keypad or touchpad is determined in step 10.2 by means of the capacitive touch sensor. This signal from the capacitive touch sensor is for example delivered to a processor in the device on which the keypad or touchpad is used. The pressure at which the pad is touched is determined in step 10.3 by means of the piezo pressure sensor. The signal from the piezo pressure sensor is also delivered to the processor and the device on which the keypad or touchpad is used. Both signals can be delivered substantially simultaneously to the processor, so that the position and pressure of the touch can be determined substantially simultaneously. The processor in the device will accept the user input in step 10.4 when the position and pressure match certain criteria, that are determined by the application that is active and other criteria that can be preprogrammed, such as a minimum pressure. Upon acceptance of the user input to the processor activates the actuator in step 10.5 to provide the user with a haptic feedback. The activation may depend on the type of registered input on the type of application that is active and on other factors can be preprogrammed or predetermined. After step 10.5 to the process returns to step 10.1 and starts all over again.

The invention has numerous advantages. Different embodiments or implementations may yield one or more of the following advantages. It should be noted that this is not an exhaustive list and there may be other advantages which are not described herein. One advantage of the invention is that it allows for the construction of a very thin keypad. Another advantage of the invention is that it provides for an adaptive keypad that can have different layouts. Yet another advantage of the invention is that it provides for a keypad that provides haptic feedback. A further advantage of the invention is that it provides for installation to minimize light leakage from a light guide in a keypad.

The term "comprising" as used in the claims does not exclude other elements or steps. The term "a" or "an" as used in the claims does not exclude a plurality.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon. Moreover, it should be appreciated that those skilled in the art, upon consideration of the present disclosure, may make modifications and/or improvements on the apparatus hereof and yet remain within the scope and spirit hereof as set forth in the following claims.

The invention claimed is:

1. A mobile device comprising a keypad and a processor, said keypad comprising a top surface layer, a light guide below the top surface layer, one or more light sources controlled by the processor and located at a peripheral edge of the light guide, a capacitive sensor coupled to said processor, and a piezo element coupled to said processor, said capacitive sensor being configured to sense touch contact and location on said top surface layer, and said piezo element being configured to sense pressure applied to said top surface.

2. A mobile device according to claim 1, wherein said processor is configured to detect a keystroke via a signal from the piezo element.

3. A mobile device according to claim 2, wherein said processor is configured to activate said piezo element upon detection of a keystroke.

4. A mobile device according to claim 1, wherein said top surface layer is monolithic or wherein said top surface layer comprises a plurality of discrete keys.

5. A mobile device according to claim 1, wherein a part of said capacitive sensor is formed by a semi-conductive layer and a non-conductive top surface layer.

6. A mobile device according to claim 1, wherein said light guide is configured to emit light received from said light source through said top surface layer in at least two patterns with different graphical layouts, and said light guide and said one or more light sources being configured to selectively emit said light in one of said at least two patterns.

7. A mobile device according to claim 6, wherein said patterns represent groups of different keypad icons.

8. A mobile device according to claim 6, wherein said light guide is provided with embossed gratings or with micro-prisms for coupling out light through said top surface layer.

9. A mobile device according to claim 8, wherein the top layer includes a layer that reduces reflections of ambient light.

10. A mobile device according to claim 8, further comprising a diffusive layer in the path of the light leaving the light guide.

11. A mobile device according to claim 9, wherein said keypad icons are arranged in a grid with columns and rows and wherein said light source is coupled to each of said columns and to each of said rows.

12. A mobile device according to claim 1, wherein said processor is configured to use the signal from the capacitive sensor layer for detecting objects proximate to the keypad or touchpad and wherein said processor is configured to light up otherwise invisible user-interface elements when an object is detected in the proximity of the keypad or touch pad.

13. A mobile device according to claim 1, wherein said one or more light sources controlled by the processor are at multiple locations on peripheral edges of the light guide.

14. A capacitive keypad construction comprising:
an electrically non-conductive top surface layer that is at least locally transparent to light,
a capacitive sensor layer under the top surface layer,
a piezo layer, and
an electrically non-conducting light guide layer disposed between the capacitive sensor layer and the piezo layer.

15. A capacitive keypad according to claim 14, wherein said light guide layer is provided with embossed gratings or with micro-prisms for coupling out light through said top surface layer.

16. A capacitive keypad according to claim 14, further comprising an upper light guide insulator above the light guide layer and a lower light guide insulator layer under the light guide.

17. A method for user input and feedback with a keypad or touchpad that includes a capacitive touch sensor and a piezo element, said method comprising:
determining a position on the keypad or touch pad at which an object touches by means of a signal from the capacitive touch sensor,
determining a pressure at which the keypad or touchpad is touched by means of the piezo element, accepting user input in accordance with the detected position and pressure, and providing feedback to the user by activating the piezo element in accordance with the detected user input.

18. A method according to claim 17, wherein a moving low to medium pressure contact with the keypad or touchpad is interpreted as a navigational input and/or wherein a substantially nonmoving medium to high pressure contact with the keypad or touchpad is interpreted as a keystroke.

19. A method according to claim 17, wherein said piezo element is activated upon detection of a keystroke for providing the user with haptic feedback concerning the acceptance of the keystroke and/or wherein said piezo element is activated during detection of navigational input.

20. A method according to claim 19, wherein the type of activation of the piezo element is dependent on the type of input and/or on the type of application in which the input is used and or on the other operating conditions of the device in which the keypad is used.

* * * * *